(12) United States Patent
Gregoire et al.

(10) Patent No.: US 7,303,602 B2
(45) Date of Patent: Dec. 4, 2007

(54) DIESEL PARTICULATE FILTER USING MICRO-WAVE REGENERATION

(75) Inventors: Daniel J. Gregoire, Thousand Oaks, CA (US); Joseph S. Colburn, Pacific Palisades, CA (US)

(73) Assignee: General Motors Corporation, Detroit, MI (US)

( * ) Notice: Subject to any disclaimer, the term of this patent is extended or adjusted under 35 U.S.C. 154(b) by 317 days.

(21) Appl. No.: 10/987,173

(22) Filed: Nov. 12, 2004

(65) Prior Publication Data

US 2006/0101793 A1  May 18, 2006

(51) Int. Cl.
*B01D 46/00* (2006.01)
*F01N 3/028* (2006.01)

(52) U.S. Cl. .............. 55/282.3; 55/282.2; 55/283; 55/385.3; 55/523; 55/524; 55/DIG. 10; 55/DIG. 30; 60/311

(58) Field of Classification Search .......... 55/282.2, 55/282.3, 385.3, 283, 523, 524, DIG. 10, 55/DIG. 30; 95/273, 278; 60/297, 303, 60/311
See application file for complete search history.

(56) References Cited

U.S. PATENT DOCUMENTS

| 4,934,141 | A | * | 6/1990 | Ollivon et al. | ............ 60/297 |
|---|---|---|---|---|---|
| 5,074,112 | A | * | 12/1991 | Walton et al. | ............ 60/311 |
| 5,087,272 | A | * | 2/1992 | Nixdorf | ............ 55/523 |
| 6,379,407 | B1 | * | 4/2002 | Blackwell et al. | ......... 55/282.3 |
| 6,540,816 | B2 | * | 4/2003 | Allie et al. | ............ 55/282.3 |
| 6,709,489 | B2 | * | 3/2004 | Ament et al. | ............ 55/282.3 |
| 2002/0069756 | A1 | * | 6/2002 | Mako et al. | ............ 95/148 |
| 2003/0061791 | A1 | * | 4/2003 | Barbier et al. | ............ 55/282.3 |

FOREIGN PATENT DOCUMENTS

DE   40 14 153 A1 * 12/1991
EP   1 541 819 A1 *  6/2005

OTHER PUBLICATIONS

PCT International Search Report mailed Feb. 2, 2007.

* cited by examiner

*Primary Examiner*—Jason M. Greene

(57) ABSTRACT

A diesel particulate filter including a microwave-absorbing target within a waveguide cavity. The cavity accepts microwave-frequency electromagnetic radiation through input couplers 90 degrees out of phase with each other to excite circular polarization heating modes. Through excitation of circularly polarized modes, heating patterns are time-averaged azimuthally to smooth out the hot and cold spots, thereby providing greater uniformity relative to heating patterns for corresponding linearly polarized modes.

17 Claims, 3 Drawing Sheets

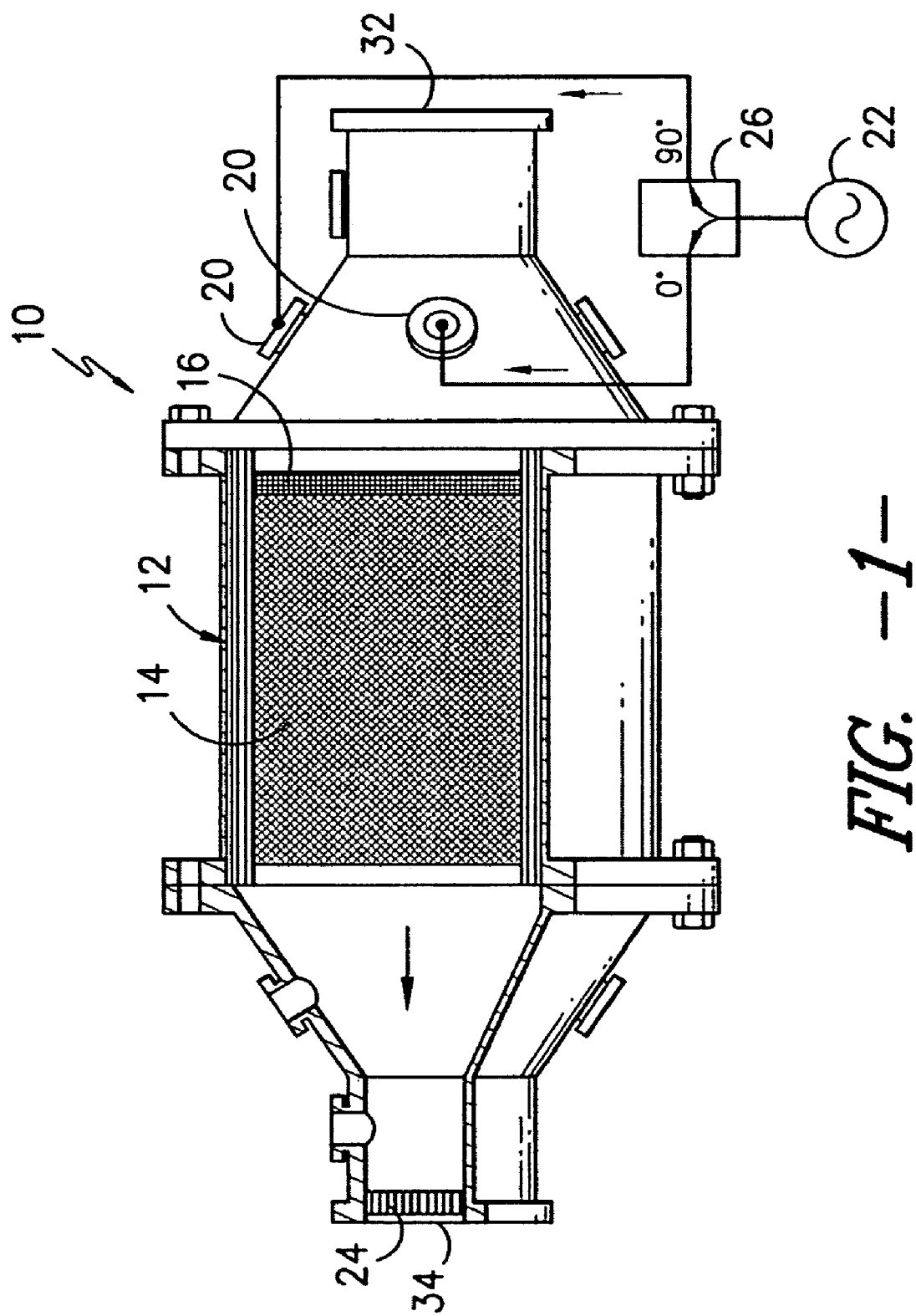
FIG. -1-

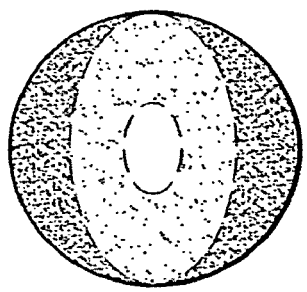
FIG. -2A-
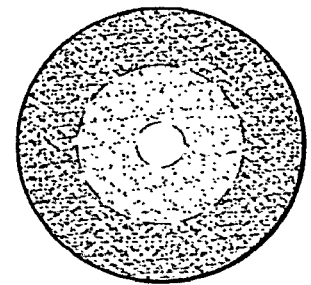
FIG. -2B-
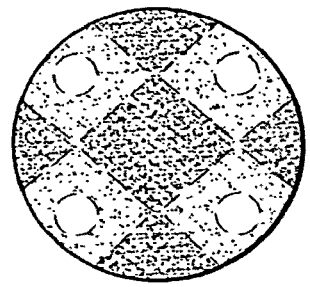
FIG. -3A-
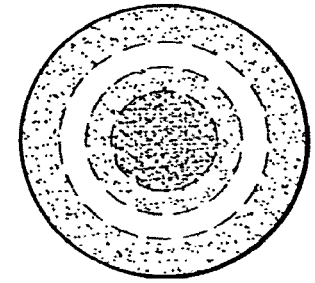
FIG. -3B-
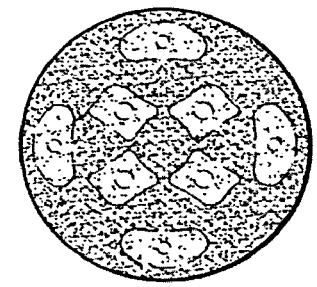
FIG. -4A-
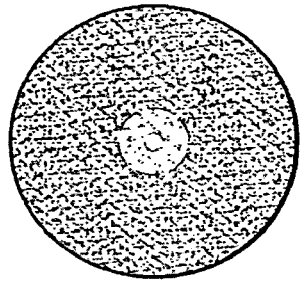
FIG. -4B-
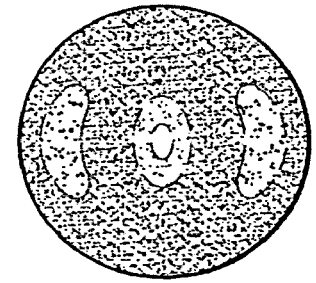
FIG. -5A-
FIG. -5B-

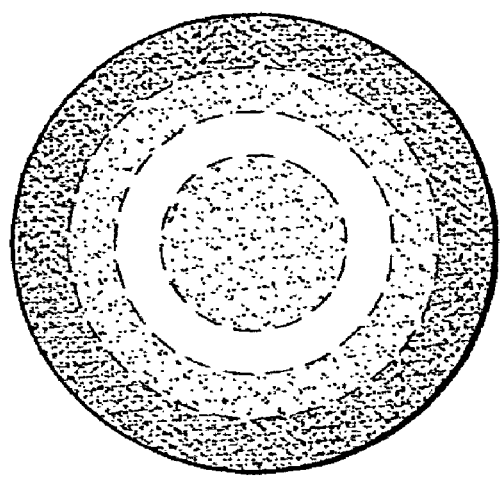
*FIG. -6-*
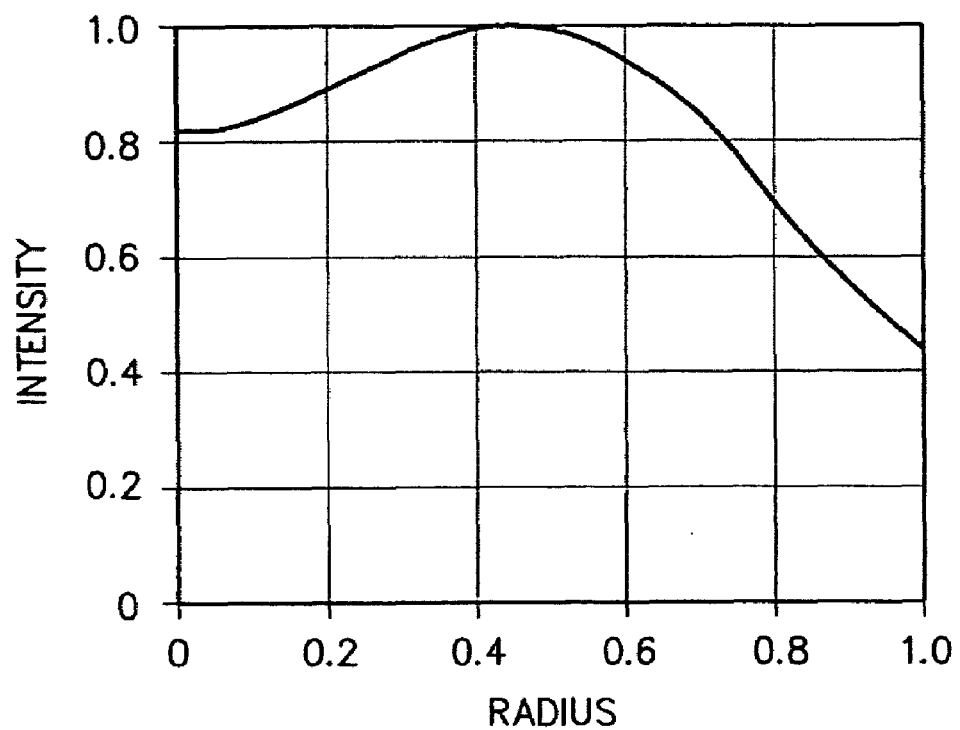
*FIG. -7-*

DIESEL PARTICULATE FILTER USING MICRO-WAVE REGENERATION

TECHNICAL FIELD

The present invention relates generally to diesel particulate filter systems, and more particularly to a diesel particulate filter system utilizing a ceramic filter to trap particulate exhaust in combination with a localized target of microwave absorbing media positioned in close proximity to regions of particulate buildup within the ceramic filter such that heating the target causes the particulate build-up to undergo combustion and vaporization so as to clean the filter. The cavity housing the ceramic filter and microwave absorbing media is adapted to accept inputs of microwave-frequency electromagnetic radiation through input couplers excited 90 degrees out of phase with each other to reduce radial non-uniformity in heating patterns across the target so as to promote uniform particulate removal across the filter.

BACKGROUND OF THE INVENTION

The use of ceramic filters to entrap particulates carried by a diesel engine exhaust flow is known. In operation, such ceramic diesel particulate filters accept exhaust flow at one end and trap particulates as exhaust gases diffuse through thin channel walls and exit out the other end. Particulate buildup which is allowed to continue causes the filter to become clogged thereby giving rise to an undesirable increased pressure differential across the filter and leading to back pressure that reduces the engine efficiency. Thus, it is necessary to clear the particulate buildup before critical levels of obstruction are achieved. Such particulate removal may be carried out by raising the temperature at the location of particulate buildup to a level above the flash point of the hydrocarbon particulates thereby causing combustion and vaporization of the particulates. Once the particulates are vaporized, the combustion products may be swept out of the filter by the exhaust stream.

In order for localized heating to efficiently remove particulates from the filter, such heating is preferably applied across substantially the entire cross-section of the filter. In the event that zones across the filter cross-section are left unheated, the particulates at those zones will not be vaporized and the filter will develop a pattern of plugged zones. Thus, it is desired to provide an efficient method of uniform heating across substantially the entire plane of the filter so as to promote particulate combustion across the entire filter plane.

The use of microwave-frequency electromagnetic radiation is known to be effective for heating dielectric materials in other environments. However, a challenge in using microwave-frequency radiation is the achievement of uniform temperature distributions across a target material. In particular, the use of microwave-frequency radiation in linearly polarized modes is highly susceptible to the creation of target hot sports and cold spots. As explained above, such nonuniformity is generally inconsistent with the requirements for particulate filter regeneration. Moreover, the environment of a particulate filter in a diesel exhaust system provides challenges with regard to space availability and cost constraints. Suitable systems for diesel exhaust filter regeneration based on microwave heating are not believed to have been previously available.

SUMMARY OF THE INVENTION

The present invention provides advantages and alternatives over the known art by providing a diesel particulate filter including a microwave-absorbing target at a defined position disposed within a waveguide cavity adapted to accept microwave-frequency electromagnetic radiation through input couplers 90 degrees out of phase with each other to excite circular polarization (CP) heating modes. Through excitation of CP modes, mode patterns are time-averaged azimuthally to smooth out the hot and cold spots in the heating pattern, thereby providing greater uniformity relative to corresponding linearly polarized modes. Still further uniformity may be realized by exciting combinations of CP modes so as to eliminate radial cold rings from the heating profile. It is contemplated that the microwave-absorbing target material is preferably embedded at or near the inlet end of the diesel particulate filter although other positions along the length of the filter may also be utilized if desired. The heating of the microwave absorbing media causes the particulate buildup to be vaporized and removed from the filter by the exhaust stream flow.

BRIEF DESCRIPTION OF THE DRAWINGS

The following drawings which are incorporated in and which constitute a part of this specification illustrate an exemplary embodiment of the present invention and, together with the general description above and the detailed description set forth below, serve to explain the principles of the invention wherein:

FIG. 1 is a cut-away view of a diesel particulate filter system incorporating a microwave-absorbing target positioned across a ceramic filter within a cavity adapted to accept a split signal of microwave-frequency electromagnetic radiation through input couplers excited 90 degrees out of phase with each other to excite circular polarization (CP) heating modes;

FIG. 2A illustrates the heating pattern of a target in a right circular cavity with conductive walls for the linearly polarized TE11 mode;

FIG. 2B illustrates the heating pattern of a target in a right circular cavity with conductive walls for the circularly polarized TE11 mode according to the present invention;

FIG. 3A illustrates the heating pattern of a target in a right circular cavity with conductive walls for the linearly polarized TE21 mode;

FIG. 3B illustrates the heating pattern of a target in a right circular cavity with conductive walls for the circularly polarized TE21 mode according to the present invention;

FIG. 4A illustrates the heating pattern of a target in a right circular cavity with conductive walls for the linearly polarized TE12 mode;

FIG. 4B illustrates the heating pattern of a target in a right circular cavity with conductive walls for the circularly polarized TE12 mode according to the present invention;

FIG. 5A illustrates the heating pattern of a target in a right circular cavity with conductive walls for the linearly polarized TE22 mode;

FIG. 5B illustrates the heating pattern of a target in a right circular cavity with conductive walls for the circularly polarized TE22 mode according to the present invention;

FIG. 6 illustrates the heating pattern of a target in a right circular cavity with conductive walls for excitation of the combination of circularly polarized TE11 and TE21 modes; and FIG. 7 is a plot of heating intensity relative to distance from the center of the target in FIG. 6 illustrating substantial uniformity over an extended portion of the radius.

While embodiments of the invention have been illustrated and generally described above and will hereinafter be described in connection with certain potentially preferred embodiments and procedures, it is to be understood and appreciated that in no event is the invention to be limited to such embodiments and procedures as may be illustrated and described herein. On the contrary, it is intended that the present invention shall extend to all alternatives and modifications as may embrace the broad principles of this invention within the true spirit and scope thereof.

DESCRIPTION OF THE PREFERRED EMBODIMENT

Reference will now be made to the various drawings wherein to the extent possible like elements are designated by corresponding reference numerals in the various views. In FIG. 1, there is illustrated a diesel particulate filter assembly 10 for disposition along the exhaust gas flow path down stream from a diesel engine (not shown). The direction of gas flow is illustrated by the directional arrow within the figure. According to the illustrated construction, the diesel particulate filter includes a cavity portion 12 that serves to contain a porous ceramic filter 14 and microwave-absorbing material 16 disposed in embedded contacting relation substantially across the cross-section of the filter 14. The cavity portion 12 may be formed of suitable materials such as metal and the like. In such a construction utilizing a metal cavity the interior walls surrounding the filter 14 may be conductive. The microwave-absorbing material 16 may be any one or a combination of well known substances which undergo heating upon exposure to microwave radiation. By way of example, such materials may include SiC (Silicon Carbide), ITO (Indium-Tin Oxide), various ferrites, and the like including combinations of such materials as may be known to those of skill in the art.

As illustrated, the diesel particulate filter assembly 10 is provided with a pair of microwave coupling input ports 20 as will be well known to those of skill in the art for operative connection to an external high power microwave source 22 of greater than 1 kW such as a standard 2.45 GHz/2 kW source as will be well known and readily available. Microwave reflectors 24 which permit gas flow but which prevent excess of trapped microwave energy are provided at the inlet and outlet ends of the diesel particulate filter assembly 10.

As illustrated, a 0-90 power divider 26 is disposed between the microwave source 22 and the input ports 20. The power divider 26 modifies the power by dividing it equally between the two input ports while simultaneously shifting the phase of the signal delivered to one of the input ports by 90 degrees. The power divider is connected to the input ports via low loss connections. The input ports 20 are preferably situated on a plane of circular cross section and are spaced with an angular separation of approximately 90 degrees. The collective effect of the spacing between the input ports 20 and the 90 degree phase shift between the power signals delivered to the input ports is to excite a circularly polarized mode within the cavity 12. By exciting circularly polarized modes, heating patterns are smoothed out azimuthally relative to linearly polarized modes to substantially eliminate the occurrence of hot and cold spots on a heated target in favor of transitional temperature rings thereby providing a more uniform average temperature profile.

In operation, diesel exhaust enters through an inlet aperture 32, passes into the filter 14 through intake channels, diffuses through the filter channel walls, flows out of the filter output channels and exits the cavity through the exhaust output aperture 34. In the flow process, particulates carried by the exhaust flow are deposited where the gases diffuse through the channel walls upon exiting the filter. As the engine continues to run, the particulate mass builds up until the exhaust gas flow is impeded. At a selected optimum point based on measured back pressure within the system, the microwave power source 22 is activated such as by a switch connected to a pressure sensor (not shown) and microwave energy enters the chamber thereby heating the microwave-absorbing material 16. The microwave-absorbing material 16 is disposed in close relation to the area of particulate buildup and as it absorbs energy, it heats to a point beyond the flash point of the accumulated hydrocarbon particulates. The particulates are thus ignited and are removed in vaporized form by the flow of exhaust gas.

As previously noted, according to the potentially preferred practice, a circularly polarized mode is intentionally excited within the cavity to eliminate azimuthal variation. That is, points on a circular target defined by the microwave-absorbing material that are equidistant from the center are characterized by substantially the same heating profile regardless of their positional angle. This provides a degree of enhanced uniformity to the heating profile of the target by eliminating localized hot spots and cold spots.

The enhanced uniformity in heating profile is illustrated by comparison of the heating patterns for linearly polarized modes illustrated in FIGS. 2A, 3A, 4A, and 5A with those of the corresponding circularly polarized modes in FIGS. 2B, 3B, 4B and 5B respectively. In particular, FIG. 2A illustrates the heating pattern of a target in a right circular cavity for the linearly polarized TE11 mode while FIG. 2B illustrates the heating pattern for the circularly polarized TE11 mode. FIG. 3A illustrates the heating pattern of a target in a right circular cavity for the linearly polarized TE21 mode while FIG. 3B illustrates the heating pattern for the circularly polarized TE21 mode. FIG. 4A illustrates the heating pattern of a target in a right circular cavity for the linearly polarized TE12 mode while FIG. 4B illustrates the heating pattern for the circularly polarized TE12 mode. FIG. 5A illustrates the heating pattern of a target in a right circular cavity for the linearly polarized TE22 mode and FIG. 5B illustrates the heating pattern for the circularly polarized TE22 mode. In these figures lighter regions correspond to higher temperatures while darker regions correspond to lower temperatures.

As can be seen in FIGS. 2A, 3A, 4A and 5A, the linearly polarized modes yield both radial variation and azimuthal or angular variation. That is, points that are equidistant from the center but at different angles relative to a hypothetical equatorial line may have temperatures that are substantially different from one another (i.e. azimuthal variation) as well as being different from points at the same angle but at different distances from the center (i.e. radial variation). Conversely, as illustrated in FIGS. 2B, 3B, 4B, and 5B, the circularly polarized modes eliminate the occurrence of azimuthal variation, although radial variation in the form of rings at different distances from the center may still be present.

The elimination of azimuthal variation allows a more regular temperature distribution across the target without hot and cold points. Thus, the available heating is more uniform overall. For example, the circularly polarized TE11, circularly polarized TE21 and circularly polarized TE22 modes exhibit temperature variations of less than 50% over more than 50% of the cross sectional surface area. This is a substantial improvement over the heating patterns for linearly polarized modes.

While the single circularly polarized mode heating patterns represent a substantial improvement over linearly polarized mode heating patterns, it is contemplated that heating pattern uniformity may be improved still further by exciting combinations of circularly polarized modes that overlap to eliminate radial cold rings. By way of example only, and not limitation, FIG. 6 illustrates the heating pattern for the combination of the circularly polarized TE11 and TE21 modes which overlap to eliminate the hot spot in the center of the TE11 mode pattern and the high temperature zone near the wall of the TE21 mode pattern. A pattern with more gradual blended radial distribution is thus achieved. These benefits are illustrated graphically in FIG. 7 wherein it is seen that the intensity of the heating pattern varies less than 50% over the total cross section and varies less than 20% over 70% of the cross section.

It is contemplated that standard microwave excitation techniques can be used to simultaneously excite two modes within the cavity 12 without any need to change the configuration of the source or input port configurations illustrated and described in relation to FIG. 1. By way of example only, and not limitation, one technique for simultaneous excitation of two modes is to design the cavity radius and length to be simultaneously resonant in both modes by satisfying the resonant length equations for both modes.

$$LB_{z,TE11} = n \text{ and } LB_{z,TE21} = m$$

Where L is cavity length, m and n are integers and $B_{z,TE11}$ and $B_{z,TE21}$, are the respective axial mode wavenumbers.

It is to be understood that while the present invention has been illustrated and described in relation to potentially preferred embodiments, constructions, and procedures, that such embodiments, constructions, and procedures are illustrative only and that the invention is in no event to be limited thereto. Rather, it is contemplated that modifications and variations embodying the principles of the invention will no doubt occur to those of ordinary skill in the art. It is therefore contemplated and intended that the present invention shall extend to all such modifications and variations as may incorporate the broad aspects of the invention within the true spirit and scope thereof.

The invention claimed is:

1. A diesel particulate filter system for removal of particulates from a diesel engine exhaust stream, the diesel particulate system comprising:
a filter housed within a containment cavity between a cavity inlet for acceptance of the engine exhaust stream and a cavity outlet for exit of the engine exhaust stream such that gases of the engine exhaust stream pass through the filter and at least a portion of the particulates within the engine exhaust stream are entrapped within the filter;
a target of microwave-absorbing material embedded within the filter, wherein the microwave-absorbing material has microwave heating characteristics such that upon exposure to microwave radiation the microwave-absorbing material heats above the combustion temperature of at least a portion of the particulates entrapped within the filter; and
a microwave power source operatively connected to microwave input ports so as to excite at least one circularly polarized microwave mode within the containment cavity such that upon activation of the microwave power source, the target of microwave-absorbing material is heated in a pattern substantially without azimuthal variation and at least a portion of the particulates entrapped within the filter in adjacent relation to the microwave-absorbing material are vaporized thereby reducing accumulation of the particulates within the filter.

2. The invention as recited in claim 1, wherein the filter is a ceramic filter.

3. The invention as recited in claim 2, wherein the micro-wave absorbing material is selected from the group consisting of SiC (Silicon Carbide), ITO (Indium-Tin Oxide), ferrites and combinations thereof.

4. The invention as recited in claim 1, wherein the containment cavity has a substantially cylindrical internal cross section and the filter is cylindrical with a substantially circular cross-section.

5. The invention as recited in claim 1, wherein the containment cavity comprises interior walls of conductive material.

6. The invention as recited in claim 5, wherein the interior walls are metal.

7. The invention as recited in claim 1, wherein the microwave power source is operatively connected to a pair of microwave input ports through a power divider such that power from the microwave power source is divided substantially equally between the pair of microwave input ports.

8. The invention as recited in claim 7, wherein the power divider shifts the phase of the signal delivered to one of the input ports by 90 degrees.

9. The invention as recited in claim 8, wherein the input ports are arranged around a circular plane with an angular separation of approximately 90 degrees relative to one another.

10. The invention as recited in claim 1, wherein the cavity is resonant in at least two different modes such that said at least two different modes are simultaneously excited.

11. A diesel particulate filter system for removal of particulates from a diesel engine exhaust stream, the diesel particulate system comprising:
a ceramic filter housed within a containment cavity between a cavity inlet for acceptance of the engine exhaust stream and a cavity outlet for exit of the engine exhaust stream such that gases of the engine exhaust stream pass through the ceramic filter and at least a portion of the particulates within the engine exhaust stream are entrapped within the filter;
a target of microwave-absorbing material embedded within the ceramic filter in transverse relation to the flow direction of the exhaust stream, wherein the microwave-absorbing material has microwave heating characteristics such that upon exposure to microwave radiation the microwave-absorbing material heats above the combustion temperature of at least a portion of the particulates entrapped within the filter; and
a microwave power source operatively connected through a power divider to a first microwave input port adapted to inject microwave radiation into the containment cavity and a second microwave input port adapted to inject microwave radiation into the containment cavity, wherein the power divider divides power from the microwave power source substantially equally between the first and second microwave input ports while shifting the phase of the signal delivered to one of the input ports by 90 degrees, and wherein the first and second microwave input ports are arranged with an angular separation of approximately 90 degrees relative to one another so as to excite at least one circularly polarized microwave mode within the containment cavity such that upon activation of the microwave power source, the target of microwave-absorbing material is heated in a pattern substantially free of azimuthal variation and at least a portion of the particulates entrapped within the filter in adjacent relation to the microwave-absorbing material are vaporized thereby reducing accumulation of the particulates within the filter.

12. The invention as recited in claim 11, wherein the micro-wave absorbing material is selected from the group consisting of SiC, (Silicon Carbide), ITO (Indium-Tin Oxide), ferrites and combinations thereof.

13. The invention as recited in claim 11, wherein the containment cavity has a substantially cylindrical internal cross section and the filter is cylindrical with a substantially circular cross-section.

14. The invention as recited in claim 11, wherein the containment cavity comprises interior walls of conductive material.

15. The invention as recited in claim 14, wherein the interior walls are metal.

16. The invention as recited in claim 11, wherein the cavity is resonant in at least two modes such that said at least two modes are simultaneously excited.

17. A diesel particulate filter system for removal of particulates from a diesel engine exhaust stream, the diesel particulate system comprising:
  a ceramic filter housed within a containment cavity between a cavity inlet for acceptance of the engine exhaust stream and a cavity outlet for exit of the engine exhaust stream such that gases of the engine exhaust stream pass through the ceramic filter and at least a portion of the particulates within the engine exhaust stream are entrapped within the filter;
  a target of microwave-absorbing material embedded within the ceramic filter in transverse relation to the flow direction of the exhaust stream, wherein the microwave-absorbing material has microwave heating characteristics such that upon exposure to microwave radiation the microwave-absorbing material heats above the combustion temperature of at least a portion of the particulates entrapped within the filter; and
  a microwave power source operatively connected through a power divider to a first microwave input port adapted to inject microwave radiation into the containment cavity and a second microwave input port adapted to inject microwave radiation into the containment cavity, wherein the power divider divides power from the microwave power source substantially equally between the first and second microwave input ports while shifting the phase of the signal delivered to one of the input ports by 90 degrees, and wherein the first and second microwave input ports are arranged with an angular separation of approximately 90 degrees relative to one another so as to excite at least one circularly polarized microwave mode within the containment cavity such that upon activation of the microwave power source, the target of microwave-absorbing material is heated in a pattern substantially free of azimuthal variation and at least a portion of the particulates entrapped within the filter in adjacent relation to the microwave-absorbing material are vaporized thereby reducing accumulation of the particulates within the filter, wherein the containment cavity has a substantially circular cross section with interior metal walls and wherein the cavity is resonant in at least two modes such that said at least two modes are simultaneously excited.

* * * * *